US011965623B2

(12) United States Patent
Favaretto

(10) Patent No.: US 11,965,623 B2
(45) Date of Patent: Apr. 23, 2024

(54) ROAD VEHICLE PROVIDED WITH A TANK FOR A COMPRESSED GAS

(71) Applicant: FERRARI S.p.A., Modena (IT)

(72) Inventor: Fabrizio Favaretto, Formigine (IT)

(73) Assignee: FERRARI S.p.A., Modena (IT)

( * ) Notice: Subject to any disclaimer, the term of this patent is extended or adjusted under 35 U.S.C. 154(b) by 0 days.

(21) Appl. No.: 17/614,585

(22) PCT Filed: Dec. 4, 2020

(86) PCT No.: PCT/IB2020/061511
§ 371 (c)(1),
(2) Date: Nov. 29, 2021

(87) PCT Pub. No.: WO2021/111397
PCT Pub. Date: Jun. 10, 2021

(65) Prior Publication Data

US 2022/0290809 A1 Sep. 15, 2022

(30) Foreign Application Priority Data

Dec. 5, 2019 (IT) ........................ 102019000023103

(51) Int. Cl.
*F17C 1/02* (2006.01)

(52) U.S. Cl.
CPC ........ *F17C 1/02* (2013.01); *F17C 2201/0109* (2013.01); *F17C 2201/035* (2013.01);
(Continued)

(58) Field of Classification Search
CPC ............................ F17C 1/02; F17C 2201/035; F17C 2221/031; F17C 2227/0157;
(Continued)

(56) References Cited

U.S. PATENT DOCUMENTS 3,925,984 A * 12/1975 Holleyman ............. F01B 23/02
180/65.245
4,596,119 A * 6/1986 Johnson .................. F01B 29/10
60/407
(Continued)

FOREIGN PATENT DOCUMENTS

AU 2016373295 A1 7/2018
CN 1688857 A 10/2005
(Continued)

OTHER PUBLICATIONS

DE-10348385-A1 English Translation of Specification (Year: 2022).*
(Continued)

*Primary Examiner* — David Colon-Morales
*Assistant Examiner* — Stephanie A Shrieves
(74) *Attorney, Agent, or Firm* — CANTOR COLBURN LLP

(57) ABSTRACT

A road vehicle having: a frame; four wheels, which are mounted on the frame in a rotary manner; a body, which covers the frame; a compressor, which produces a compressed gas; and at least one tank, which receives the compressed gas from the compressor and has a containing chamber, which is delimited by a wall. The wall of the tank includes: an inner panel, which directly delimits the containing chamber and is in contact with the compressed gas; and an outer panel, which completely surrounds the inner panel and is arranged parallel to the inner panel and at a constant distance from the inner panel.

8 Claims, 3 Drawing Sheets

(52) U.S. Cl.
CPC .............................. *F17C 2203/012* (2013.01); *F17C 2203/0629* (2013.01); *F17C 2221/031* (2013.01); *F17C 2227/0157* (2013.01); *F17C 2227/0346* (2013.01); *F17C 2227/0381* (2013.01); *F17C 2270/0168* (2013.01)

(58) Field of Classification Search
CPC ...... F17C 2227/0346; F17C 2227/0381; F17C 2270/0168; F17C 2221/012; F17C 2250/032; F17C 2250/043; F17C 2250/0439; F17C 2250/072; F17C 2260/023; F17C 2203/012; F17C 2203/0629; F17C 2203/0682; F17C 1/00; F17C 2203/0626; F17C 2223/0161; B65D 7/22; B65D 2588/12
USPC ........ 141/4; 220/560.11, 560.1, 560.05, 568, 220/592, 921, 918
See application file for complete search history.

(56) References Cited

U.S. PATENT DOCUMENTS

| | | | | |
|---|---|---|---|---|
| 6,182,717 | B1 * | 2/2001 | Yamashita | B60K 15/03006 141/2 |
| 7,866,354 | B2 * | 1/2011 | Kanoya | F17C 5/06 141/82 |
| 7,938,150 | B2 * | 5/2011 | Handa | F17C 5/007 165/41 |
| 9,206,793 | B2 * | 12/2015 | Lee | F17D 1/07 |
| 9,343,754 | B2 * | 5/2016 | Inagi | H01M 8/04014 |
| 2007/0113918 | A1 * | 5/2007 | Kanoya | F17C 5/06 165/200 |
| 2011/0231047 | A1 * | 9/2011 | Aixala | B60T 17/02 417/253 |
| 2012/0111447 | A1 * | 5/2012 | Mori | F17C 3/025 141/82 |
| 2013/0118152 | A1 | 5/2013 | Quaade et al. | |
| 2021/0316577 | A1 * | 10/2021 | Gaillaud | B60C 23/14 |

FOREIGN PATENT DOCUMENTS

| | | | | |
|---|---|---|---|---|
| CN | 101162782 B | 8/2010 | | |
| CN | 101815893 A | 8/2010 | | |
| CN | 103423584 A | 12/2013 | | |
| DE | 10348385 A1 * | 5/2005 | B60H 1/00278 | |
| GB | 870269 | 6/1961 | | |
| GB | 870269 A * | 6/1961 | | |
| WO | 0041906 A1 | 7/2000 | | |
| WO | 2017103500 A1 | 6/2017 | | |

OTHER PUBLICATIONS

International Search Report and Written Opinion for Application No. PCT/IB2020/061511 dated Mar. 25, 2021, 15 pages.
Office Action in CN Patent App. 202080039048.7, dated May 31, 2023, 13 pages.

* cited by examiner

ROAD VEHICLE PROVIDED WITH A TANK FOR A COMPRESSED GAS

CROSS-REFERENCE TO RELATED APPLICATIONS

This patent application claims priority from Italian patent application no. 102019000023103 filed on May 12, 2019, the entire disclosure of which is incorporated herein by reference.

TECHNICAL FIELD

The invention relates to a road vehicle provided with a tank for a compressed gas.

PRIOR ART

In a road vehicle, it is possible to store energy in the form of a high-pressure compressed gas contained inside a tank.

For example, the high-pressure compressed gas could be hydrogen to be supplied to fuel cells for the generation of electrical energy. Alternatively, the high-pressure compressed gas could be compressed air used to drive pneumatic actuators, which drive the valves of an internal combustion engine, or used to drive pneumatic actuators, which generate compressed air jets adapted to change the motion of the vehicle.

Generally speaking, in order to reduce the weight of the tank, the tank itself is made of light materials, such as carbon fibre or other composite materials.

The compression of a high-pressure gas heats the gas itself, which can reach high temperatures that can even exceed the maximum temperature the material making up the tank can stand (especially when the tank is made of composite materials, which have a low heat resistance). In order to avoid overheating the tank, it has been suggested to increase the thickness of the tank wall to make it more resistant to heat, it has been suggested to previously cool the compressed gas through heat exchangers arranged upstream of the tank and it has been suggested to feed the compressed gas to the tank with a very small flow rate (namely, very slowly) so as to attenuate the heating of the tank caused by the hot compressed gas flowing in.

However, known solutions lead to a significant weight and size increase, also because of the need to have suited heat exchangers arranged upstream of the tank, introduce load losses in the compressed gas, due to the fact that the latter has to flow through the heat exchangers, and make the filling of the tank very slow.

U.S. Pat. No. 6,182,717B1 and patent applications CN101162782A, GB870269A and US2013118152A1 describe a tank for a fluid under pressure having a containing chamber, which is delimited by a wall consisting of an inner panel, which directly delimits the containing chamber and is in contact with the fluid, and of an outer panel, which completely surrounds the inner panel and is arranged parallel to and at a constant distance from the inner panel.

DESCRIPTION OF THE INVENTION

The object of the invention is to provide a road vehicle provided with a tank for a compressed gas, said tank not suffering from the drawbacks discussed above, namely being particularly light and capable of standing the inflow of a compressed gas having high temperatures and, at the same time, being simple and economic to be manufactured.

According to the invention, there is provided a road vehicle provided with a tank for a compressed gas according to the appended claims.

The appended claims describe preferred embodiments of the invention and form an integral part of the description.

BRIEF DESCRIPTION OF THE DRAWINGS

The invention will now be described with reference to the accompanying drawings, showing a non-limiting embodiment thereof, wherein.

PREFERRED EMBODIMENTS OF THE INVENTION

Figure 1:
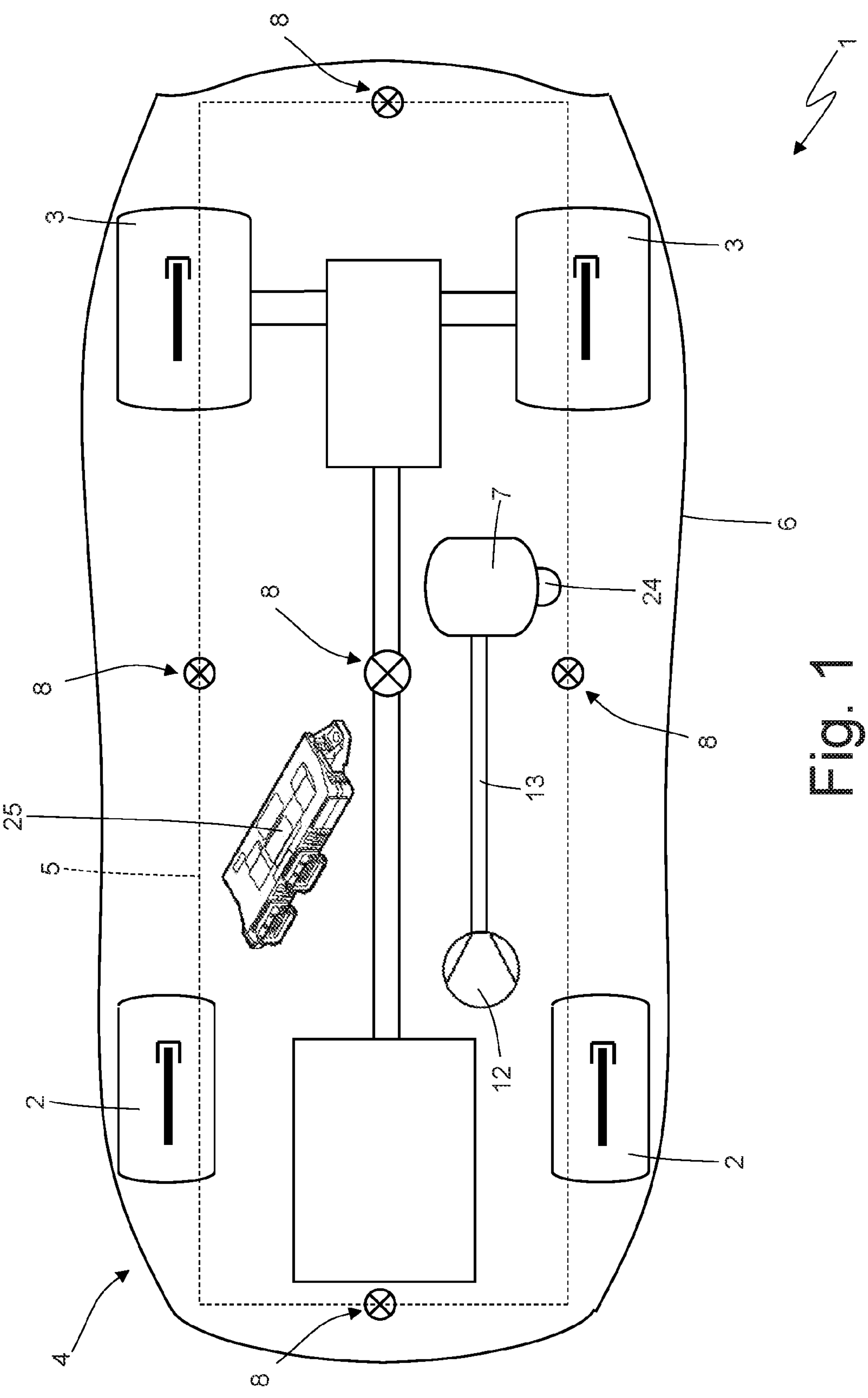
FIG. 1 is a schematic, plan view of a road vehicle, in particular a car, provided with a tank manufactured according to the invention.

In FIG. 1, number 1 indicates, as a whole, a road vehicle (hereinafter, without losing in generality, also referred to as car) provided with two front wheels 2 and two rear drive wheels 3, which receive the torque from a powertrain system 4. The powertrain system 4 can be an exclusively heat-based system (namely, solely comprising an internal combustion heat engine), a hybrid system (namely, comprising an internal combustion heat engine and at least one electric motor) or an electric system (namely, solely comprising one or more electric motors).

The car 1 comprises a frame 5, which supports, among other things, the powertrain system 4 and the wheels 2 and 3; namely, the four wheels 2 and 3 are fitted to the frame 5 in a rotary manner through the corresponding suspensions.

Furthermore, the car 1 comprises a body 6, which covers the frame 5 and is mounted on the frame 5.

The car 1 comprises at least one tank 7 for a compressed gas, for example compressed air, which could have, for example, a nominal pressure of 700-900 bar.

Figure 3:
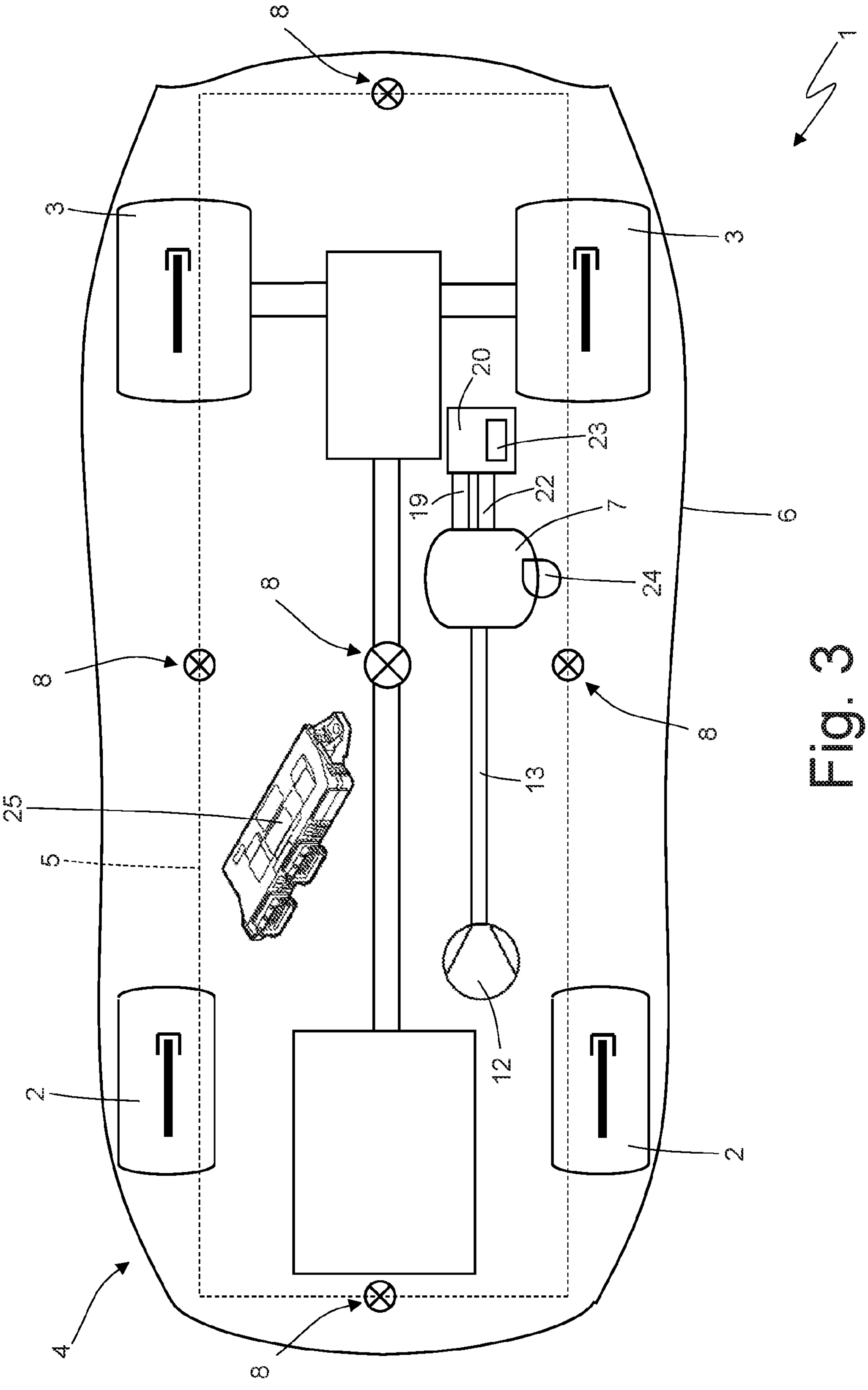
FIG. 3 is a schematic, plan view of another embodiment of the road vehicle of FIG. 1.

In the embodiments of FIGS. 1 and 3, the car 1 comprises one single compressed gas tank 7, but, according to other embodiments which are not shown herein and are perfectly equivalent, several compressed gas tanks 7 are provided, which can be permanently connected one another in a pneumatic manner (so as to have the same inner pressure) or can be pneumatically independent of one another.

Figure 2:
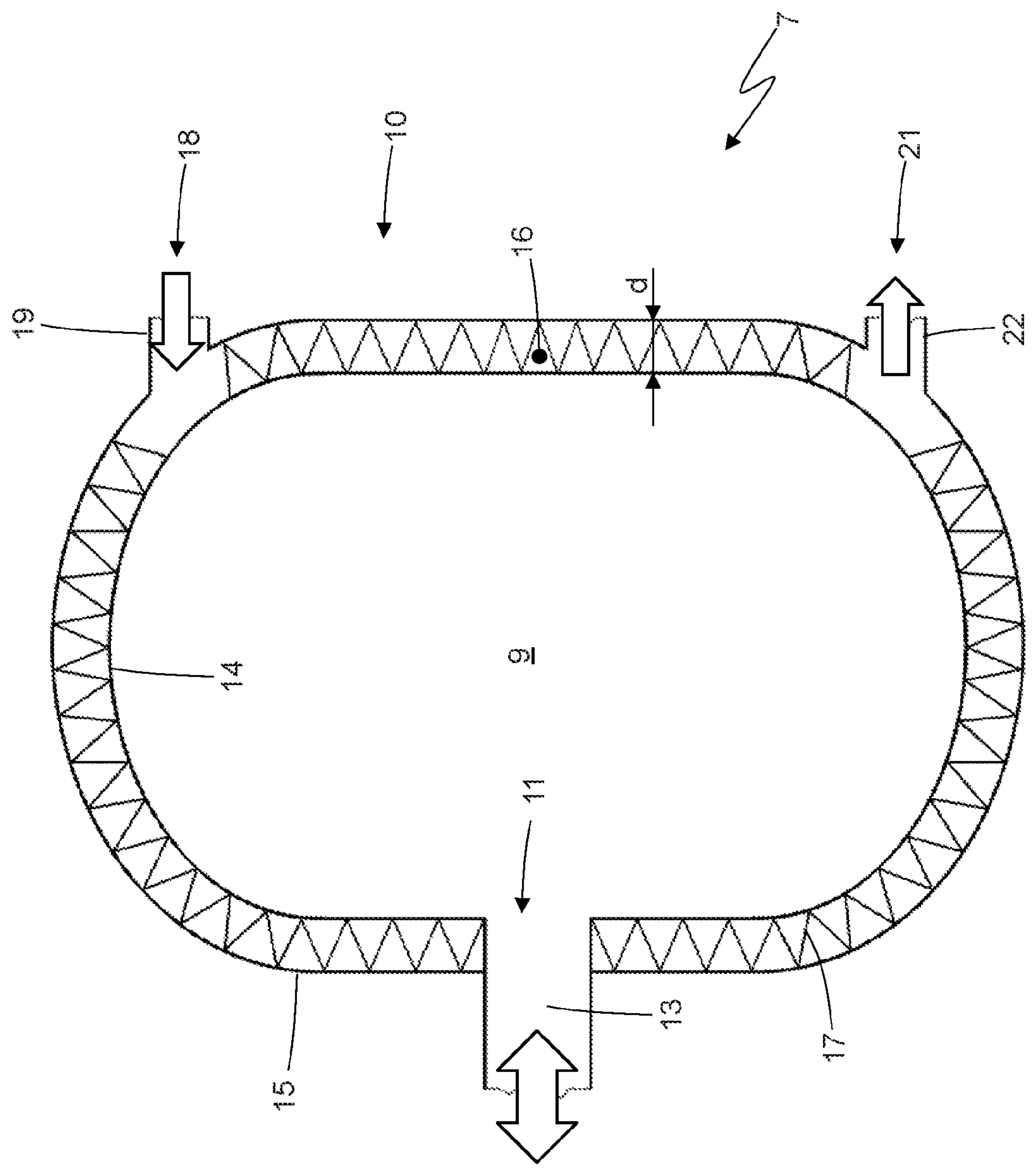
FIG. 2 is a schematic, cross-section view of the tank of FIG. 1.

FIG. 2 shows an embodiment of the compressed gas tank 7, which comprises a containing chamber 9 delimited by a wall 10. The containing chamber 9 comprises a main opening 11, which is configured to connect the containing chamber 9 to the outside, so as to empty or fill the containing chamber 9 from/with the compressed gas.

According to an embodiment that is not shown herein and is not part of the invention, the compressed gas is compressed air and comes from a compressor or from a further tank arranged on the outside of the road vehicle 1 and to which the compressed gas tank 7 is connected during a filling operation.

According to the embodiment shown in FIGS. 1 and 3, the road vehicle 1 houses a compressor 12, which is permanently connected to the main opening 11 of the compressed gas tank 7 by means of a compressed gas feeding duct 13 and feeds the compressed gas to the compressed gas tank 7.

The wall 10 of the tank 7 has, for example, a cylindrical shape or a spherical shape. Furthermore, the wall 10 of the tank 7 is made of materials having a high resistance and a low weight (such as, for example, titanium, Ti).

According to FIG. 2, the wall 10 comprises an inner panel 14, which directly delimits the containing chamber 9 and is in contact with the compressed gas; furthermore, the wall 10 comprises an outer panel 15, which completely surrounds the inner panel 14, is arranged parallel to the inner panel 14 and at a constant distance d from the inner panel 14. As a consequence, the inner panel 14 and the outer panel 15 define a gap 16 between them.

Furthermore, a plurality of connection elements 17 (schematically shown in FIG. 2) extend in the gap 16 and are configured to physically connect the inner panel 14 and the outer panel 15 to one another. According to a preferred embodiment, the connection elements 17 have the shape of tetrahedrons; according to further embodiments that are not shown herein, the connection elements 17 can have further geometrical shapes different from the tetrahedron shape. In general, the connection elements 17 have light geometrical shapes with a high structural degree and are such that, in case the wall 10 of the tank 7 is subjected to a stress (for example, the pressure of the compressed gas in the containing chamber 9 acting upon the inner panel 14), the wall 10 is capable of resisting said stress, thus avoiding significant deformations or perforations of the tank 7 due to the stress itself.

Furthermore, the connection elements 17 take up only part, for example 10% to 25%, of the total volume of the gap 16; namely, the gap 16 is substantially empty (i.e. it is more empty than full).

The wall 10 further comprises an auxiliary inlet opening 18, which is separate from and independent of the main opening 11 and is configured to allow a cooling fluid to be introduced into the gap 16 through an auxiliary inlet duct 19 (schematically shown in FIGS. 2 and 3), the latter being separate from the feeding duct 13, so as to let the cooling fluid into the gap 16. According to some embodiments, the cooling fluid is a gas, such as air coming from the outside; therefore, the auxiliary inlet duct 19 is connected to the outside through an air inlet obtained in the body 6 and is configured to allow air to flow from the outside towards the gap 16. Alternatively, according to a further embodiment schematically shown in FIG. 3, the cooling fluid is a liquid, for example water; therefore, the auxiliary inlet duct 19 is connected to a cooling circuit 20 (schematically shown in FIG. 3), which comprises a radiator 23, contains the cooling fluid and is configured so as to allow the cooling fluid to flow towards the gap 16.

The wall 10 further comprises an auxiliary outlet opening 21, which is separate from and independent of the main opening 11 of the containing chamber 9 and the auxiliary inlet opening 18 and is configured to connect the gap 16 to an auxiliary outlet duct 22, the latter being separate from the feeding duct 13 and the auxiliary inlet duct 19, so as to allow the cooling fluid to flow out of the gap 16. According to the embodiments in which the cooling fluid is a gas, such as air coming from the outside, the auxiliary outlet duct 22 is connected to the outside and is configured to allow air to flow from the gap 16 to the outside. Alternatively, according to the further embodiment of the invention in which the cooling fluid is a liquid, the auxiliary outlet duct 22 is connected to the cooling circuit 20 (schematically shown in FIG. 3) and is configured to allow the cooling fluid to flow from the gap 16 to the cooling circuit 20.

The tank 7 described above can be manufactured through known manufacturing techniques, such as additive manufacturing processes, for example 3D printing, or through melting processes.

Furthermore, the tank 7 described above can advantageously be used to cool the inner panel 14 when the containing chamber 9 is filled with a high-pressure and, hence, high-temperature compressed gas; indeed, in this case, the inner panel 14, which is in direct contact with the compressed gas, gets heated and the temperature increase of the inner panel 14 itself can lead to a significant variation in the mechanical properties of the inner panel 14. Thanks to the fact that the cooling liquid flows in the gap 16, namely in contact with the inner panel 14, said cooling fluid is capable of lowering the temperature of the inner panel 14 and, hence, of allowing the tank 7 to contain compressed gases with higher pressures and temperatures.

According to FIGS. 1 and 3, the car 1 comprises a plurality of gas pushers 8 (namely, pneumatic pushers 8), each of which is connected to the compressed gas tank 7 in order to receive the compressed gas from the compressed gas tank 7, is integral to the frame 5 (namely, transmits the pneumatic thrust to the frame 5) and has a plurality of nozzles (not shown), which face outwards (from the body 6 and, hence, from the car 1) and can be activated so as to each generate an air jet flowing out of the nozzle. The pneumatic thrust generated by each gas pusher 8 directly acts upon the frame 5 (namely, upon the structure) of the car 1 without using the tyres of the wheels 2 and 3. Basically, each nozzle of each gas pusher 8 is a valve, which opens and closes upon command a compressed air flow, which is accelerated during the expansion at supersonic speed.

According to FIGS. 1 and 3, there is provided a pressure and/or temperature sensor 24, which determines (measures) a pressure and/or a temperature inside the compressed gas tank 7. Furthermore, there is provided a control unit 25, which is connected to the pressure and/or temperature sensor 24 and is configured to drive the cooling circuit 20 so as to cause the cooling fluid to flow through the gap 16 of the tank 7 when the compressor 12 feeds the compressed gas into the containing chamber 9 of the tank 7. Basically, the control unit 25 is configured to introduce the cooling fluid when, for example, the pressure and/or the temperature detected by the pressure and/or temperature sensor 24 exceeds a given threshold, namely when it is determined that the compresses gas is causing the inner panel 14 of the wall 10 to reach a temperature close to the maximum temperature the inner panel 14 can stand.

According to FIGS. 1 and 3, the compressor 12, which is connected to the compressed gas tank 7, is designed to receive the motion from a front axle (namely, from the two front wheels 2) or from a rear axle (namely, from the two rear wheels 3). In other words, a rotor of the compressor 12 can be connected to the front axle (namely, to the two front wheels 2) or to the rear axle (namely, to the two rear wheels 3) in order to be operated by the front wheels 2 or by the rear wheels 3 (thus, exploiting the motion of the front wheels 2 or the motion of the rear wheels 3). In particular, the control unit 25 activates the compressor 17, using the motion received from the wheels 2 or 3, during the braking phase so as to use the kinetic energy owned by the car 1, which would otherwise be dissipated in heat by the braking system.

As already mentioned above, the compressor 12 compresses air coming from the atmosphere; the compressed air produced by the compressor 12 and stored in the tank 7 is subsequently used as described in patent application EP3674152A1, which is included herein by reference, so as to supply the gas pushers, which are operated to exert an additional thrust of pneumatic type upon the vehicle.

According to a different embodiment which is not shown herein and is not part of the invention, there is no compressor 12 and, hence, the compressed gas tank 7 is filled only when the road vehicle 1 is parked, through an outer filling system.

The embodiments described herein can be combined with one another, without for this reason going beyond the scope of protection of the invention.

The compressed gas tank 7 described above has numerous advantages.

First of all, the structure of the wall 10 allows the total weight of the compressed gas tank 7 to be significantly reduced, provided that the structural resistance remains the same.

Furthermore, the structure of the wall 10 allows the portion of the tank 7 in contact with the compressed gas (namely, the inner panel 14) to be cooled without having to cool the compressed gas or slowly introduce the compressed gas into the tank 7. In other words, by causing the cooling fluid to flow in the gap 16 it is possible to avoid deformations or perforations of the tank 7 caused by the high temperature of the compressed gas, without having to previously cool the compressed gas and without having to feed the compressed gas very (too) slowly.

Finally, the tank 7 described above is simple and economic to be manufactured.

LIST OF THE REFERENCE NUMBERS OF THE FIGURES

1 road vehicle/car
2 front wheels
3 rear wheels
4 powertrain system
5 frame
6 body
7 compressed air tank
8 gas pusher
9 containing chamber
10 wall
11 main opening
12 compressor
13 feeding duct
14 inner panel
15 outer panel
16 gap
17 plurality of connection elements
18 auxiliary inlet opening
19 auxiliary inlet duct
20 cooling circuit
21 auxiliary outlet opening
22 auxiliary outlet duct
23 radiator
24 pressure and/or temperature sensor
25 control unit

The invention claimed is:

1. A road vehicle (1) comprising:

a frame (5);

two front wheels (2) and two rear wheels (3), which are mounted on the frame (5) in a rotary manner;

a body (6), which covers the frame (5);

a compressor (12), which compresses air coming from the atmosphere and produces a compressed air; and at least one tank (7), which receives and stores the compressed air produced by the compressor (12) and comprises a containing chamber (9), which is delimited by a wall (10);

wherein the compressor (12) receives a motion from a front axle or from a rear axle so as to be operated by the front wheels (2) or by the rear wheels (3);

wherein the wall (10) of the tank (7) comprises: an inner panel (14), which directly delimits the containing chamber (9) and is in contact with the compressed air; an outer panel (15), which completely surrounds the inner panel (14) and is arranged parallel to the inner panel (14) and at a constant distance (d) from the inner panel (14); and a plurality of connection elements (17), which extend between the inner panel (14) and the outer panel (15) so as to physically connect the two panels (14, 15) to one another without completely filling a gap (16), which is defined between the two panels (14, 15) and is isolated from the compressed air containing chamber (9);

wherein a cooling circuit (20) is provided, which is coupled to the tank (7) so as to cause a cooling fluid, which is separate from and independent of the air compressed by the compressor (12), to flow through the gap (16) of the tank (7); and wherein a control unit (25) is provided and is configured to drive the cooling circuit (20) so as to cause the cooling fluid to flow through the gap (16) of the tank (7) when the compressor (12) feeds the compressed air into the containing chamber (9) of the tank (7).

2. The road vehicle (1) according to claim 1, wherein:

the cooling fluid is a liquid; and the cooling circuit (20) comprises a radiator (23).

3. The road vehicle (1) according to claim 1, wherein the cooling fluid is air coming from the outside.

4. The road vehicle (1) according to claim 1, wherein the connection elements (17) have the shape of tetrahedrons.

5. The road vehicle (1) according to claim 1, wherein the connection elements (17) occupy 10% to 25% of the total volume of the gap (16).

6. The road vehicle (1) according to claim 1, wherein the tank (7) comprises:

a main opening (11), which connects the containing chamber (9) to the compressor (12) so as to fill or empty the containing chamber (9); and an auxiliary inlet opening (18), which is separate from and independent of the main opening (11) and connects the gap (16) to the cooling circuit (20) so as to let the cooling fluid into the gap (16).

7. The road vehicle (1) according to claim 6, wherein the tank (7) comprises an auxiliary outlet opening (21), which is separate from and independent of the main opening (11) and the auxiliary inlet opening (18) and connects the gap (16) to the cooling circuit (20) so as to let the cooling fluid out of the gap (16).

8. The road vehicle (1) according to claim 1, wherein the compressor (12) is permanently connected to a main opening (11) of the compressed air tank (7) through a feeding duct (13).

* * * * *